(12) United States Patent
Christodoulou

(10) Patent No.: US 10,757,962 B2
(45) Date of Patent: Sep. 1, 2020

(54) SYSTEM FOR EXTRACTING A SUBSTANCE FROM A COMMODITY

(71) Applicant: Spyros Christodoulou, Larnaca (CY)

(72) Inventor: Spyros Christodoulou, Larnaca (CY)

( * ) Notice: Subject to any disclaimer, the term of this patent is extended or adjusted under 35 U.S.C. 154(b) by 343 days.

(21) Appl. No.: 15/611,914

(22) Filed: Jun. 2, 2017

(65) Prior Publication Data

US 2017/0265513 A1 Sep. 21, 2017

Related U.S. Application Data

(63) Continuation of application No. PCT/GB2015/053714, filed on Dec. 4, 2015.

(30) Foreign Application Priority Data

Dec. 4, 2014 (GB) .................................. 1421599.0

(51) Int. Cl.
*A23N 1/02* (2006.01)
*C11B 1/04* (2006.01)
(Continued)

(52) U.S. Cl.
CPC ........... *A23N 1/02* (2013.01); *B01D 17/0214* (2013.01); *B02C 18/304* (2013.01); *B02C 18/34* (2013.01);
(Continued)

(58) Field of Classification Search
CPC . A23N 4/085; A23N 4/22; A23N 1/02; A23N 3/00; A23N 15/02; A23N 4/06; C11B 1/06; C11B 1/00; C11B 1/04; B01D 17/0214; B02C 18/304; B02C 18/34; B02C 23/10; B30B 9/12; B30B 9/127
See application file for complete search history.

(56) References Cited

U.S. PATENT DOCUMENTS

| 1,800,336 A * | 4/1931 | Bernier ..................... C11B 1/04 554/8 |
| 1,876,820 A * | 9/1932 | Zoul ........................ C11B 1/00 554/8 |
| 2006/0165861 A1 * | 7/2006 | Picci ........................ C11B 1/06 426/519 |

FOREIGN PATENT DOCUMENTS

| EP | 0557758 A1 | 9/1993 |
| EP | 1767104 A2 | 3/2007 |

(Continued)

OTHER PUBLICATIONS

International Preliminary Report on Patentability for PCT Patent App. No. PCT/GB2015/053714 (dated Jun. 6, 2017).

(Continued)

*Primary Examiner* — Hong T Yoo
(74) *Attorney, Agent, or Firm* — Jones Robb, PLLC

(57) ABSTRACT

A system 400 for obtaining a substance from a commodity has a first apparatus 420 with first 422 and second 424 openings, a device 426 for moving the commodity through the first apparatus, and at least one blade 428 for shearing the commodity. The at least one blade 428 is positioned between the first opening 422 and the second opening 424. A second apparatus 440 has a first opening 442 and a second opening 444, with the first opening 442 being fluidly connected to the second opening 424 of the first apparatus 420. The second apparatus 440 includes a device 446 for moving the sheared commodity from the second apparatus first opening 442 to the second opening 444. A third apparatus 460 obtains the substance from the sheared commodity, including a separator 460 having a first opening 462 fluidly connected to the second opening 444 of the second apparatus 440.

19 Claims, 7 Drawing Sheets

(51) Int. Cl.
*C11B 1/06* (2006.01)
*B30B 9/12* (2006.01)
*B01D 17/02* (2006.01)
*B02C 18/30* (2006.01)
*B02C 18/34* (2006.01)
*B02C 23/10* (2006.01)

(52) U.S. Cl.
CPC ............. *B02C 23/10* (2013.01); *B30B 9/12* (2013.01); *B30B 9/127* (2013.01); *C11B 1/04* (2013.01); *C11B 1/06* (2013.01)

(56) References Cited

FOREIGN PATENT DOCUMENTS

| FR | 929459 A | 12/1947 |
|----|----------|---------|
| WO | WO99/61568 A1 | 12/1999 |
| WO | WO2006/093474 A1 | 9/2006 |
| WO | WO2013/076592 A1 | 5/2013 |

OTHER PUBLICATIONS

International Search Report for PCT Patent App. No. PCT/GB2015/053714 (dated Feb. 10, 2016).

Search Report for Great Britain Patent App. No. GB1421599.0 (dated May 22, 2015).

"Oliomio Gold" (YouTube); Mori-Tem Srl., Jan. 31, 2014—see https://www.youtube.com/watch?v=HiPW-uAE1L8.

"Compact and continuous olive oil production", Alfa Laval., Aug. 2012—see http://www.alfalaval.com/solution-finder/products/alfaoliver/Documents/Crushers%20and%20depitters%20for%20olive%20oil%20extraction%20plants_PFT00505EN.pdf.

Kalua, C. M., et al., "Olive oil volatile compounds, flavour development and quality: A critical review," Food Chemistry 2007;100:273-286.

* cited by examiner

SYSTEM FOR EXTRACTING A SUBSTANCE FROM A COMMODITY

This application is a Continuation of, and claims priority under 35 U.S.C. § 120 to, International App. No. PCT/GB2015/053714, filed 4 Dec. 2015, and claims priority therethrough to GB App. No. 1421599.0, filed 4 Dec. 2014, the entireties of which are incorporated by reference herein.

BACKGROUND

Field of Endeavor

The present application relates to an apparatus, system, and method for extracting a substance from commodities such as fruit and vegetables, and more particularly, but not exclusively, to a system for obtaining juice from olives, for use in extracting olive oil.

Brief Description of the Related Art

Olive oil is a product that has been used for centuries in cooking, cosmetics, pharmaceuticals and for fuel, and olive oil production has been with humankind since prehistoric times, according to evidence that provide the artefacts and archaeological remains of the most ancient civilizations. The oil from an olive fruit can be produced by grinding olives to a pulp and extracting the oil by mechanical or chemical means.

FIG. 1 shows a simplified diagram of a plant cell 100. Plant cell 100 includes a cell wall 110, a thick rigid membrane that surrounds the cell 100. This layer of cellulose fiber gives the cell much of its support and structure. The cell wall 110 also bonds with other cell walls to form the structure of the plant or fruit. The plant cell 100 includes a vacuole 120, a large membrane sack storing cell sap, sugars, proteins, minerals, lipids, water, and enzymes. Cytoplasm 130 is a jelly-like substance enclosed by a cell membrane 140 and which provides a medium for chemical reactions to take place. An optimum environment for reactions involving enzymes has a pH of 5. Also shown in plant cell 100 is nucleus 150 and chloroplast 160.

FIG. 2 shows a schematic diagram of an olive drupe 200. The olive drupe 200 includes epicarp, or skin, 210; mesocarp, or flesh, 220; and endocarp, or stone, 230. The majority (96-98%) of the oil in an olive is found in the mesocarp 220, or flesh, of the olive, and in particular in the vacuole 120 of the plant cell 100. The remainder of the oil can be found in the endocarp 230, or stone. In order to extract oil from an olive, the cell walls 110 of the olive plant cells must be collapsed, a process known as "lysis". Lysis may be achieved using, for example, mechanical pressure applied using a press, which causes the cell walls to rupture under pressure. Lysis may also be achieved using enzymatic reactions.

Approximately 2% of an olive is made up of organic acids, pigments, phenolic compounds, and minerals. Retaining these compounds in the extracted oil is desirable. The greater the polyphenol content of olive oil, the greater the health benefits the olive oil may bestow when consumed. Olive oil phenols can be divided into three categories: simple phenols, secoiridoids, and lignans. The most important polyphenols include: hydroxytyrosol, tyrosol, and verbascoside. Polyphenol concentration in the olive oil may be affected by heat, oxidation, water content, and mechanical centrifugation. These four factors can be introduced during the olive oil extraction process.

Archaeological findings from the Minoan Palaces in Crete provide examples of olive oil's role in the Cretan or Minoan civilization, which reached its zenith between 2000 and 1450 BC.

There are stone mortars and presses used for olive oil extraction that date back to 5000 BC.

Artefacts found at archaeological sites associated with making oil include milling stones, decantation basins, and storage vessels such as mass-produced amphorae with olive plant residues.

The Romans are considered responsible for the industrialization of, and bringing about a significant increase in, olive oil production between 200 BC and AD 200. The Romans contributed to the technological development in olive processing by expediting the crushing operation with a revolving millstone, and improving the separation system with the introduction of woven mats mechanically squeezed above the settling vats. An example process as developed by the Romans is shown in FIG. 3.

There were no significant improvements to olive oil extraction systems until the introduction of the hydraulic pressing systems (invented by Joseph Graham in 1795).

Even today there are small olive oil extraction facilities using large revolving millstones, crushing the olive drupes, malaxing the resulting paste, applying the olive paste to mats, hydraulically pressing out the olive juice and recovering the olive oil by sedimentation/decantation. The success of this process is totally dependent on the experience of the operator, very laborious, and results in a high cost per liter of oil.

Expansion occurred during the second half of the 20th century, when Italian engineering companies have made technological advances.

Today's olive oil production is based on four main critical processes:

a) crushing (or milling): the olive drupe is centrifugally thrown and forced by revolving bars though 4 to 8 mm screens. A standard food industry hammer or pin mill is used b) malaxing—a predetermined quantity of olive paste is deposited in a vessel with mechanical agitating revolving blades so that enzymatic and chemical/biochemical changes of olive paste can take place, as well as coalescing of oil droplets.

c) horizontal centrifugation (decanter) of the malaxed paste—separating the solids (or pomace) from the olive juices.

d) Vertical plate centrifugation—separating and clarifying the olive oil from the water content of the olive juices.

These processes are performed as part of a batch process.

The present technology of rupturing the olive drupe has a detrimental effect of dissolving atmospheric air, with an oxygen concentration of 21%, in the olive paste. This introduction of air has been shown to initiate primary stages of oil oxidation and the catalytic activity of fruit enzymes Polyphenol Oxidates (PPO) and Peroxidase (POX). During this process, Volatile Compounds (VC) are released through the action of enzymes.

Numerous scientific studies have been carried out to investigate the crucial process of malaxing and its influence on Virgin Olive Oil (VOO) quality. In many olive oil mills the malaxing process is controlled manually or with a single control loop that maintains only some flows and temperatures at constant values, although there are many more factors that affect the quality of the olive oil. Usually operators must use their experience to monitor and control the process.

Malaxing is a complex chemical bioprocess and very relevant to the quality and composition of the final product. Malaxing conditions, such as time, temperature, and the composition of the atmosphere in contact with the olive paste, influence the activity of the enzymes that are responsible for the healthy and organoleptic properties of the VOO. Research has demonstrated that malaxation not only causes oil drops to coalesce but also affects the biochemical and physical-chemical properties influencing the final quality of the EVOO. The significance of controlling the oxygen concentration during malaxing has been highlighted in numerous studies as the third most important process condition after the temperature and residence time of malaxing.

The free oxygen in contact with the olive paste during malaxing increases the degradation of phenolic compounds and limits the malaxing time for optimum olive oil yield.

The inherent disadvantages of the batch malaxing processes are numerous. Some critical ones are:

while the malaxer is being loaded and unloaded, the enzymatic reactions and primary oxidation are taking place within the olive paste the malaxing time of the entire olive paste batch is not uniform across the entire load it is very difficult to apply a closed loop rheological process control for optimum and homogeneous malaxation it is almost impossible to control homogenously the rheological properties of the entire malaxing charge of olive paste The time of malaxation does not include the times of loading and unloading of the malaxer.

Centrifugation is used to separate the different phases. This process occurs in a horizontal screw conveyor centrifuge with continuous discharge of the solid phase (i.e., a decanter) and liquid.

The use of a vertical disc stack centrifuge separator, which is the most efficient system for final olive oil cleaning, is suspected to be responsible for negative effects on the olive oil quality (e.g., loss of aroma) and loss of stability of the final product due to oxidative reactions mainly due to oil heating and to the increased amount of dissolved oxygen in the VOO.

To achieve a higher polyphenol concentration, and to preserve the polyphenols that are present in the oil, improved methods of extraction are sought.

One method proposes using, for example, solid carbon dioxide, "dry ice", which causes water molecules inside the fruit to freeze, bursting the cell walls of the olives. An alternative method proposes applying two directions of force with a hydraulic press, instead of the usual one.

SUMMARY

In a first aspect there is provided a system for obtaining a substance from a commodity comprising a first apparatus, the first apparatus having a first opening and a second opening, and configured to form a paste from the commodity, a second apparatus having a first opening and a second opening, the first opening of the second apparatus fluidly connected to the second opening of the first apparatus, the second apparatus comprising a means for moving the paste from the first opening of the second apparatus to the second opening of the second apparatus and a third apparatus for obtaining the substance from the paste, the third apparatus having a first opening fluidly connected to the second opening of the second apparatus.

The first apparatus may be configured to anaerobically compact the paste.

The first apparatus may be configured to continuously extrude the anaerobically compacted paste from the first apparatus to the second apparatus at a first rate.

The first apparatus may comprise a means for moving the commodity from the first opening to the second opening. The first apparatus may comprise at least one blade for shearing the commodity, the at least one blade positioned between the first opening of the first apparatus and the second opening of the first apparatus. The sheared commodity may comprise a paste.

The first apparatus may comprise a means for moving the commodity from the first opening to the second opening such that the commodity is continuously moved from the first opening to the second opening.

The second apparatus may comprise a means for moving the sheared commodity from the first opening of the second apparatus to the second opening of the second apparatus such that the sheared commodity is continuously moved from the first opening of the second apparatus to the second opening of the second apparatus at the first rate.

The first opening of the third apparatus may be fluidly connected to the second opening of the second apparatus such that the third apparatus can continuously receive the sheared commodity from the second apparatus at the first rate.

The first apparatus may comprise a plurality of blades for shearing the commodity.

The first apparatus may comprise at least one perforated plate corresponding to each blade.

The perforations of the perforated plate have a diameter of between 0.5 to 20 mm.

The perforations of the perforated plate have a diameter of between 2 to 10 mm.

The first apparatus may comprise a plurality of perforated plates and a plate proximal to the first opening has perforations of a larger diameter than a plate proximal the second opening.

The means for moving the commodity of the first apparatus may comprise a screw thread.

The screw thread may comprise an auger.

The first apparatus may comprise a means for controlling oxygen concentration in the first apparatus.

The second apparatus may comprise a cylindrical body.

The second apparatus may comprise a shaft disposed concentrically within the cylindrical body.

The cylindrical shaft may comprise at least one protrusion disposed radially inward.

The at least one protrusion may comprise a spike.

The means for moving the sheared commodity from the first opening of the second apparatus to the second opening of the second apparatus may comprises a means for kneading the sheared commodity.

The means for moving the sheared commodity from the first opening of the second apparatus to the second opening of the second apparatus may comprise a screw thread.

The second apparatus may comprise at least one window.

The second apparatus may comprise at least one connection port.

The connection port may be connectable to a pipe for supplying the second apparatus with a gas.

The connection port may be connectable to a control instrument. The control instrument may be a closed loop control instrument.

The commodity may comprise one of fruit and vegetables.

The commodity may comprise olives and the substance may be olive juice.

The third apparatus may comprise a means for separating solids and liquids in the paste.

The separator may comprise a screw press.

The separator may comprise a first concentric cylinder and second concentric cylinder disposed within the first concentric cylinder, and wherein the second concentric cylinder is permeable.

The system may comprise a sedimentation tank or a series of gravimetrically decanting vessels for further processing of the substance.

The system may comprise a pump for continuously moving the substance from the separator to the series of gravimetrically decanting vessels or sedimentation tank.

Although the above aspect has been described as system, it should be appreciated that each apparatus of the system may be modular and may be provided separately or in combination.

In a second aspect, there is provided a process comprising: moving a commodity from a first opening of a first apparatus to a second opening of a first apparatus, forming a paste from the commodity in the first apparatus, moving the paste to a first opening of a second apparatus and from the first opening of the second apparatus to the second opening of the second apparatus and obtaining a substance from the commodity in a third apparatus.

The process may be continuous.

Forming a paste from the first commodity may comprise shearing the commodity using at least one blade.

The process may comprise compacting the paste in the first apparatus such that the paste is anaerobic.

The process may comprise continuously extruding the anaerobically compacted paste from the first apparatus into the second apparatus at a first rate.

The method may comprise moving the paste from the first opening of the second apparatus to the second opening of the second apparatus at the first rate.

The extruded commodity may have plug flow characteristics.

The process may comprise comprising milling the sheared commodity in the first apparatus using at least one perforated plate.

The process may comprise kneading the sheared commodity in the second apparatus.

The process may comprise controlling environmental conditions in at least one of the first and second apparatus.

The process may comprise controlling environmental conditions using at least one closed loop sensors.

Environmental conditions may comprise one of temperature, pressure and oxygen concentration.

The pressure in the second apparatus may be higher than atmospheric pressure

In the above, different embodiments and apparatus have been described. It should be appreciated that further embodiments may be provided by the combination of any two or more of the embodiments described above.

BRIEF DESCRIPTION OF THE DRAWINGS

Embodiments shall now be described by way of reference to the figures in which.

DETAILED DESCRIPTION OF EXEMPLARY EMBODIMENTS

Figure 1:
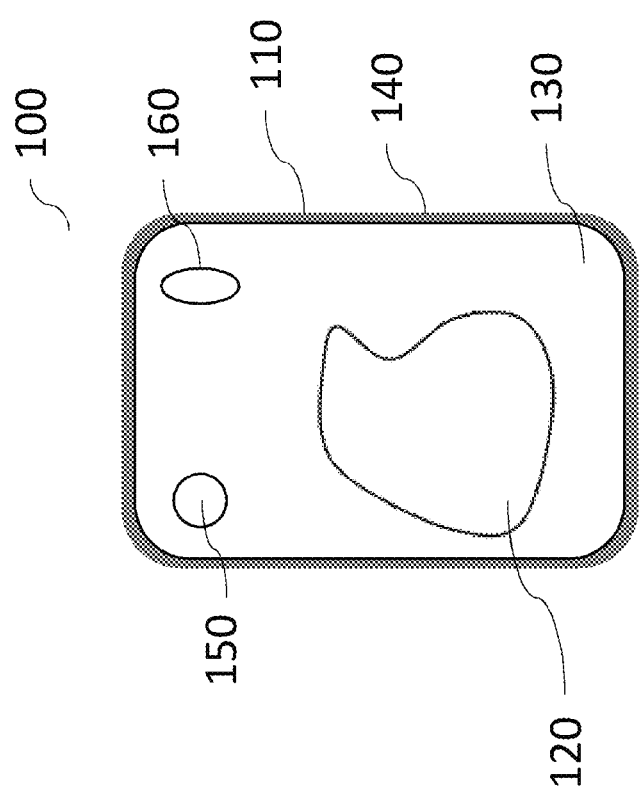
FIG. 1 shows a schematic view of a simplified plant cell.
Figure 2:
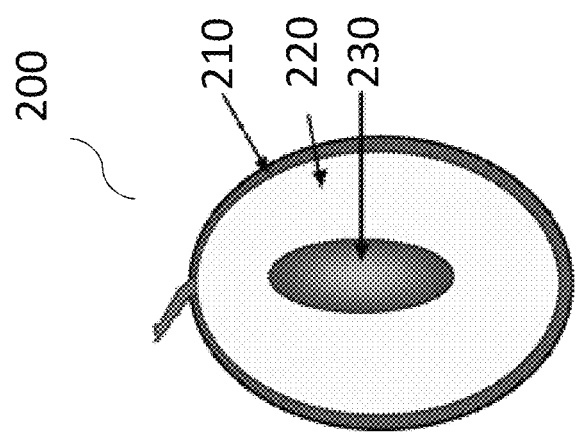
FIG. 2 shows a schematic cross-section of an olive drupe.
Figure 3:
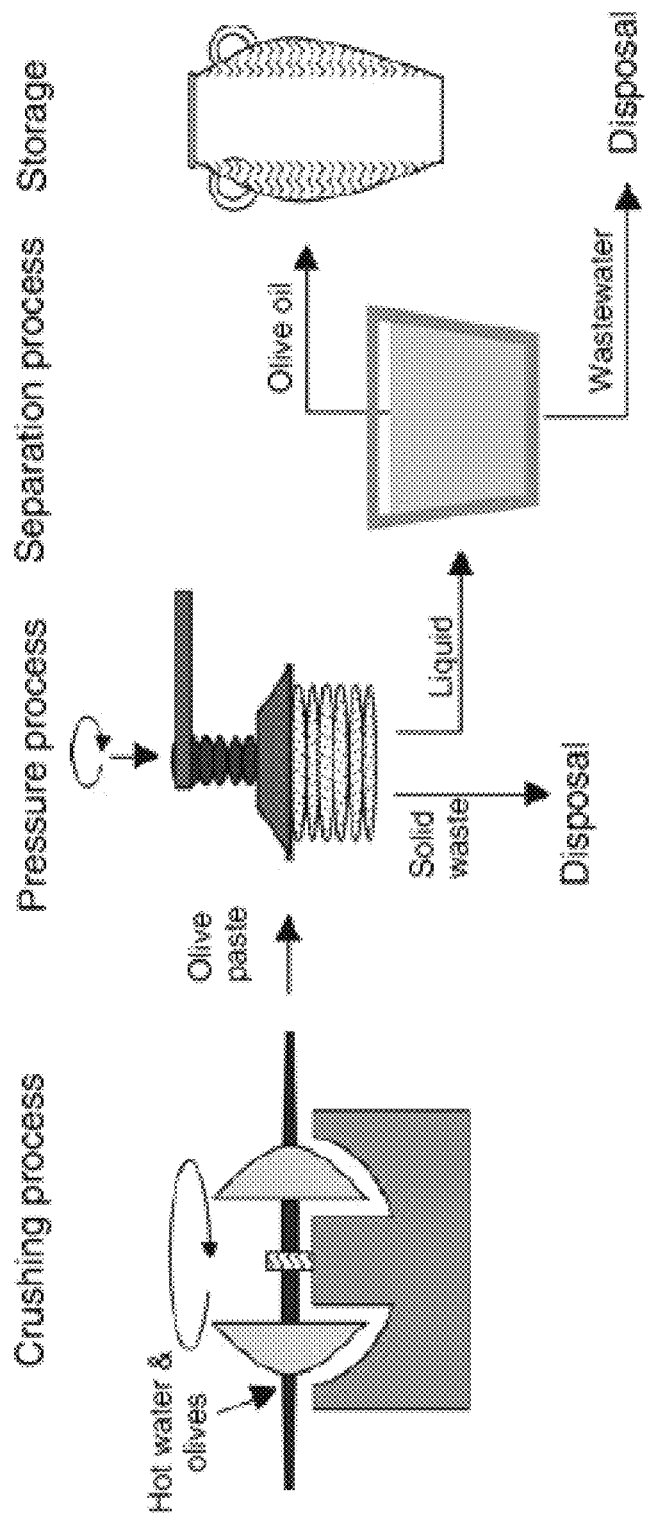
FIG. 3 shows a schematic cross-section of an apparatus for processing olive oil during the Roman time.
Figure 4:
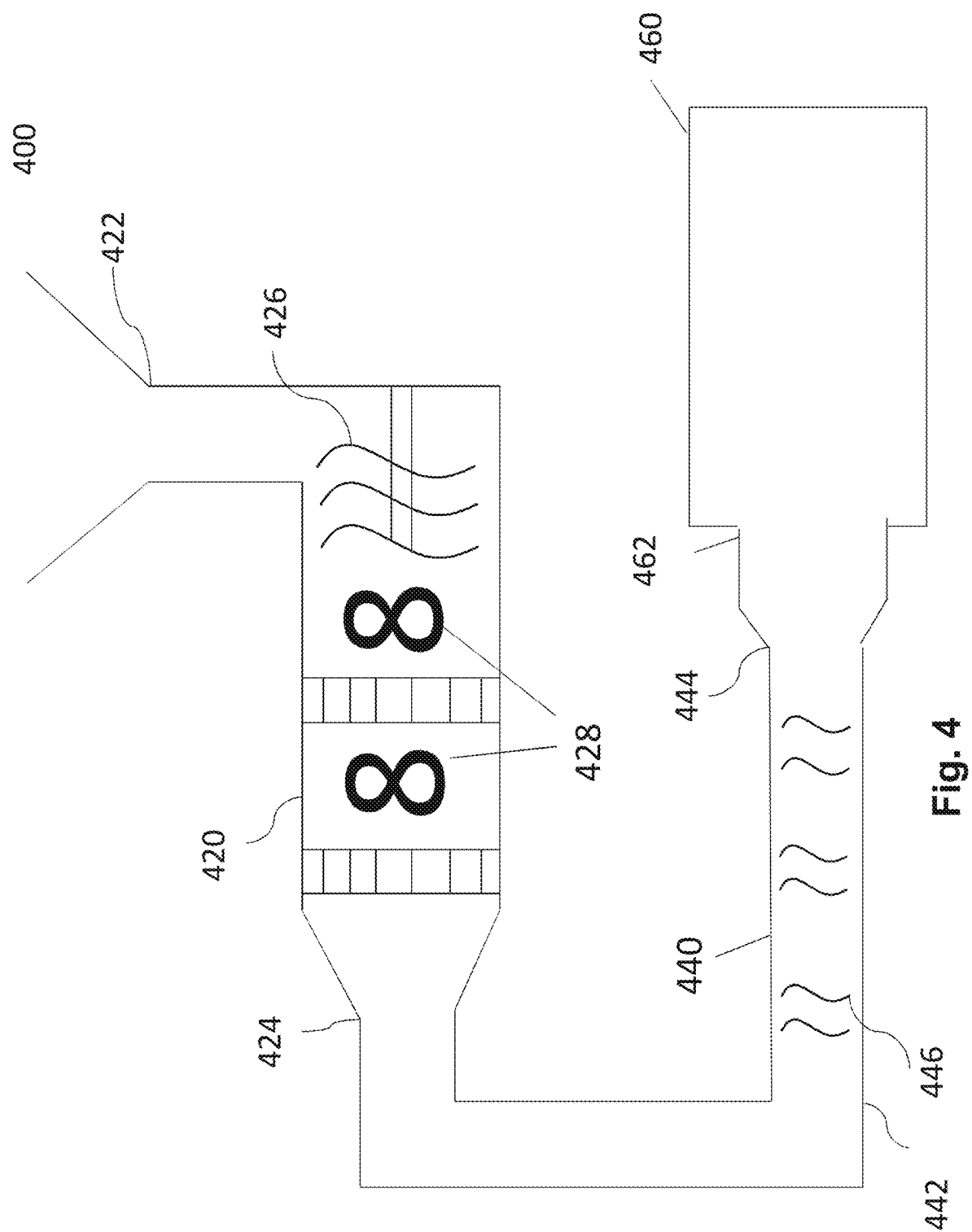
FIG. 4 shows a schematic cross-section of a system in accordance with some embodiments.

FIG. 4 shows a system 400 for extracting a substance, e.g., juice, from a commodity, such as fruit or vegetables and in particular olives, in accordance with some embodiments. The system 400 includes a first apparatus 420, a second apparatus 440, and a third apparatus 460. Each of the first and second apparatus has a first, inlet, opening and a second, outlet, opening, while the third apparatus has a first, inlet, opening and two outlet openings (see FIG. 7). The outlet opening 424 of the first apparatus 420 is fluidly connected to the inlet opening 442 of the second apparatus 440. The outlet opening 444 of the second apparatus 440 is fluidly connected to the inlet opening 462 of the third apparatus 460. A first outlet opening 464 of the third apparatus is fluidly connected to a sedimentation vessel. The second outlet opening 466 of the third apparatus is where the solid phase of the commodity is collected.

The first apparatus 420 may include a means for moving a commodity (e.g. a plant commodity such as a vegetable or fruit commodity) from the first opening 422 of the first apparatus to the second opening 424 of the first apparatus such that the commodity is continuously moved in a direction from the first opening 422 to the second opening 424. The first apparatus 420 may comprise a means for producing a paste from the first commodity. The means may be capable of homogenizing the consistency of the paste as it is produced. The first apparatus may comprise a means for anaerobically compacting the paste. The means may be capable of extruding the paste in a solid mass such that commodity may be continuously extruded, in the form of a solid mass, from the outlet of the first apparatus to an inlet opening of the second apparatus. That is, the first apparatus 420 is capable of continuously supplying the second apparatus with the commodity in in the form of a homogenous paste, extruded in a flowable paste, whose flow can be modelled as a continuous plug flow.

The second apparatus 440 may comprise a means for moving the commodity from the first opening 442 of the second apparatus 440 to the second opening 444 of the second apparatus 440 such that the commodity, in the form of a homogenized paste, is continuously moved from the first opening 442 of the second apparatus 440 to the second opening 444 of the second apparatus 440. The means for moving may cause the paste to move through the second apparatus at the rate at which the paste is received from the first apparatus. The interior of the second apparatus may be pressurized above atmospheric pressure, e.g. at 3 to 4 bars (300 to 400 kPa).

The flow of the paste through the second apparatus may be modelled as a plug flow and the reactions taking place in the second apparatus may be determined using the plug flow reactor model. The residence time distribution (RTD) (τ) of a chemical reactor or vessel is a description of the time that different fluid elements spend inside the reactor. Some important aspects of the plug flow reactor are all calculations performed with PFRs assume no upstream or downstream mixing, as implied by the term "plug flow". Reagents (any gasses or liquids) may be introduced into the PFR at locations in the reactor other than the inlet. In this way, a higher efficiency may be obtained, or the size and cost of the PFR may be reduced. In the ideal tubular reactor, which is called the "plug flow" reactor, specific assumptions are made about the extent of mixing, e.g., there is no mixing in the axial direction, i.e., the direction of flow, and complete mixing in the radial direction. The mixing in the radial direction is in laminar flow conditions. A uniform velocity profile across the radius is assumed. The PFR model is the converse of the complete mixing assumption of the ideal stirred tank reactor.

The first opening 462 of the third apparatus 460 may be fluidly connected to the second opening 444 of the second apparatus 440 such that the third apparatus 460 can continuously receive the paste from the second apparatus 440. The paste may be received from the second apparatus at the same rate as the paste is received by the second apparatus from the first apparatus. The third apparatus may comprise a means for separating the paste into solids and liquids.

The continuous flow of the commodity from the first apparatus to the second apparatus, through the second apparatus, and into the third apparatus at a single flow rate, and as a solid plug flow, allows a complete, continuous, process, including preparation of paste from a first commodity using a first apparatus, malaxing the paste using a second apparatus, and separation of solids from juices using a third apparatus.

Figure 5:
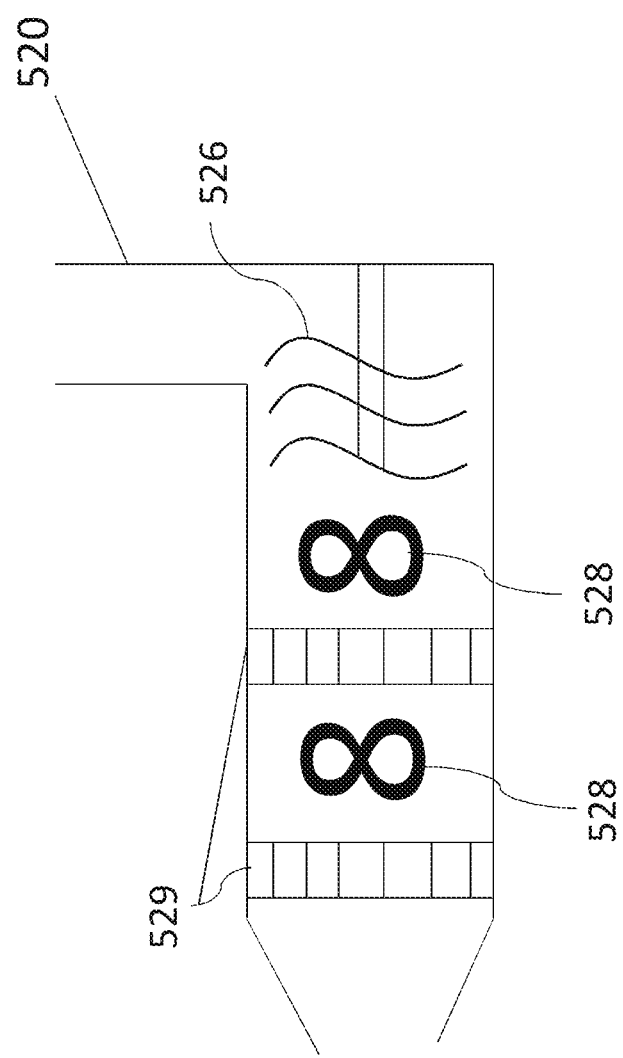
FIG. 5 shows a schematic cross-section of an apparatus in accordance with some embodiments.

An example of a first apparatus 420 will now be described with reference to the grinding or milling apparatus as shown in FIG. 5. The first apparatus includes a screw 526, or auger. The means for moving the commodity may comprise a means for compressing, or compacting, the commodity such that once the commodity is milled or sheared into a paste, the oxygen is substantially removed from the commodity, e.g., the commodity is anaerobically compacted. The compacting may be hydraulic or mechanical.

Means for producing a paste from a first commodity may comprise at least one perforated plate 529 and at least one blade 528 as shown in FIG. 5. The at least one perforated plate 529 may include a number of perforations, or holes. Although the example apparatus shown in FIG. 5 includes two perforated plates, the number of perforated plates may be between one to five and, more particularly, between one to three. The size of the perforation in each plate may differ. For example, the size of the perforations in each plate may decrease from the plate positioned nearest the inlet opening 422 of the first apparatus 420 to the plate positioned nearest the outlet opening 424 of the first apparatus 420. The size of the perforations may be between 20 to 0.5 mm, and preferably from 10 to 2 mm. A one blade 528 corresponding to each plate 529 may be provided, as shown in FIG. 5. The blade may be a rotating blade and may be positioned proximal to the inlet opening, relative to the corresponding perforated screen.

In one embodiment, the system may include a means for flushing the first apparatus 420 with an inert gas, for example nitrogen. The system 400 may include nitrogen injection means at the first end 442, or input, of the first apparatus 420. This means that the introduction of oxygen, along with the introduction of fruit to the machine, can be minimized and the transformation of the fruit into a paste, e.g., by milling and/or shearing, takes place in an oxygen free environment. Alternatively, or in addition, the system 400 may comprise nitrogen injection means between the first end 422 and the second end 424 of the first apparatus 420, for example, between screw 526 and the at least one blade 528 as in FIG. 5, or at the point in the apparatus where the commodity is anaerobically compacted. This means that oxygen trapped between the fruit as the fruit is sheared or milled can be flushed out. The overall oxygen presence in the first apparatus of the system 400 is thus reduced or eliminated.

Figure 6:
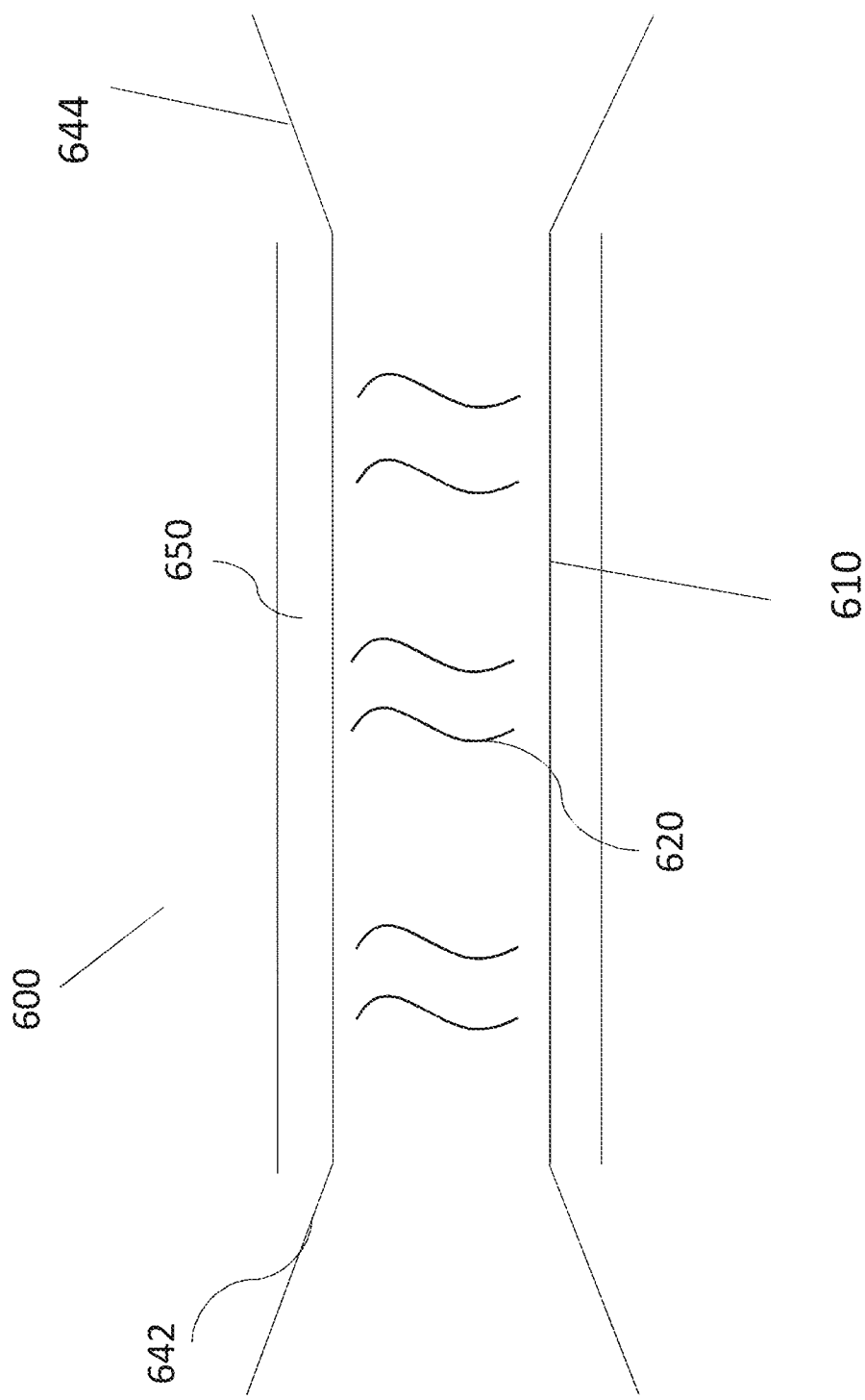
FIG. 6 shows a schematic cross-section of an apparatus in accordance with some embodiments.

The second apparatus 440 may be a malaxer, or reaction chamber and be referred to as a malaxing and/or kneading reaction conveyor. An example of the second apparatus 600 will be described with reference to FIG. 6. In an embodiment, the second apparatus 600 may include a cylindrical body 610 having a first, inlet, opening 642 and a second, outlet, opening 644.

In one embodiment, the second apparatus 440 may include a concentric cylindrical shaft within a cylindrical body. The concentric cylindrical shaft may rotate about an axis running lengthwise between the first opening of the second apart and the second opening of the apparatus. The cylindrical shaft may include inward protrusions. The inward protrusions may include inwardly protruding spikes.

The second apparatus may have a pump for moving the paste from the first opening of the second apparatus to the second opening of the second apparatus. The pump may move the paste at the same rate at which the paste is introduced into the second apparatus.

Alternatively, or in addition, positioned within the body, between the first opening and the second opening, the second apparatus may have a screw 620 for kneading and propelling fruit paste. The rotational speed of the screw 620 may be continuously variable. The rotation speed of the screw may be configured such that the paste moves through the second apparatus at the rate at which the paste is introduced to the second apparatus.

The length of the second apparatus 600 may be temperature controlled. The body 610 may include an insulated jacket 650 which can heat and or/cool the interior of the second apparatus 600.

At least one window (not shown), for observation and sampling, may be provided along the body 610 of the second apparatus 600. The body 610 may have further inlets, e.g., pipe connection, for sampling the paste, or supplying various gases or other substances to the interior of the body 610. In addition, a number of connections may be provided for connecting various control process instruments, e.g., thermometers or closed loop sensors.

Figure 7:
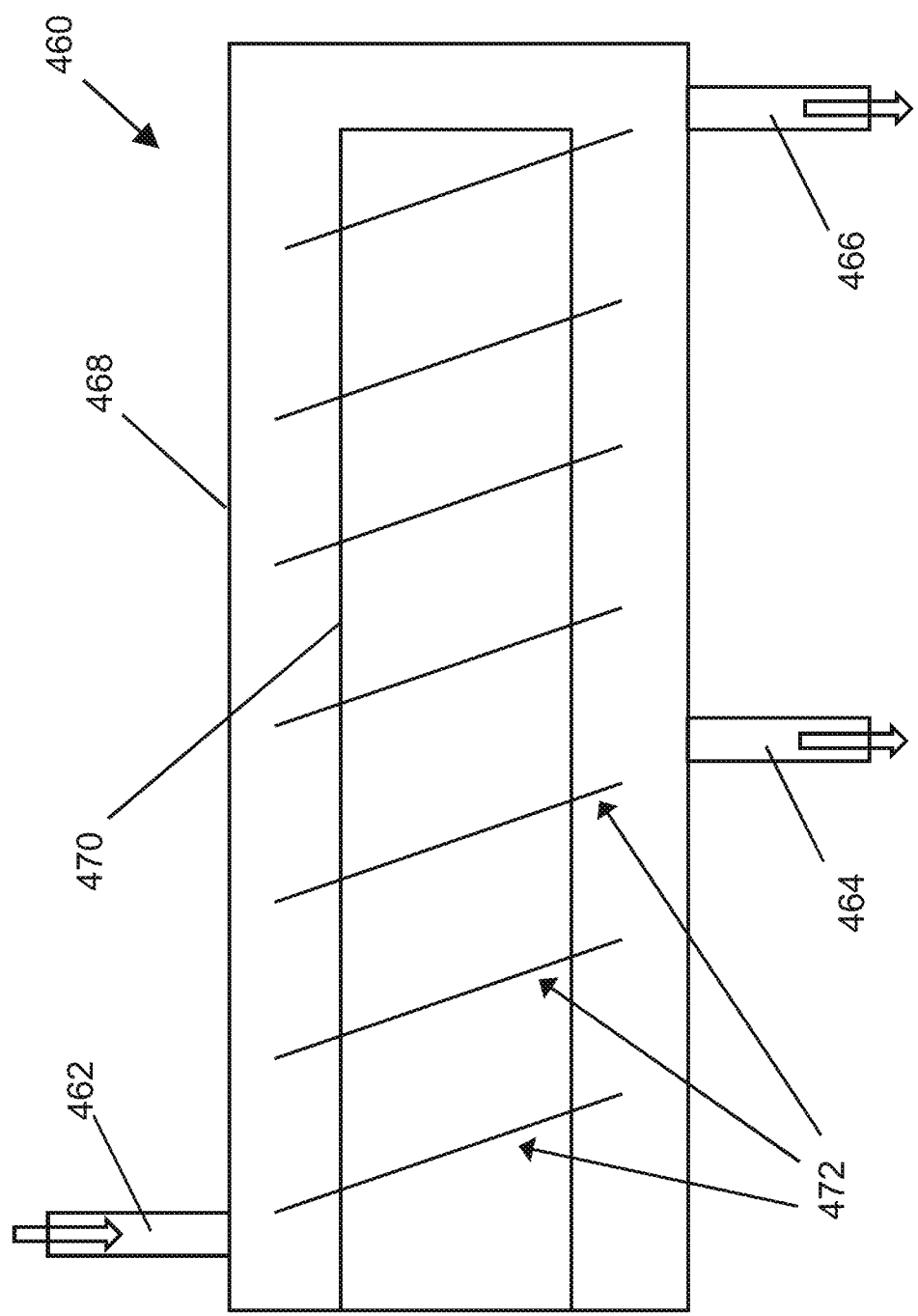
FIG. 7 shows a schematic cross section of another apparatus in accordance with some embodiments.

The third apparatus 460, which may be a separator apparatus, may include a cylindrical screw press (see FIG. 7). The cylindrical screw press includes a first inlet opening 462 which is fluidly connected to the outlet opening of the second apparatus. The screw press may be configured by two concentric cylinders 468, 470. The first, outer, cylinder 468 is static and optionally is permeable. The second, inner, cylinder 470 is also optionally permeable. The second cylinder may have peripherally attached forward propelling blades 472. The second cylinder may be rotatable so that the plug flow solid mass is compressed so that liquids from the paste can be separated from the solids and collected at the first outlet opening of the third apparatus. Under pressure the homogenized paste is propelled circumferentially through the two cylinders of which one is permeable allowing the liquids of the homogeneous paste to be separated from the solids of the paste.

In use, the commodity, e.g., in the example described below, olive drupes, are fed into the first inlet opening of the first apparatus 420, e.g., using a hopper. The olive drupes may be tightly compacted by the moving means, e.g., screw 426 under a controlled oxygen environment while being forced through a series of perforated screens 429 and blades 428. The environment may be a zero-oxygen environment or the oxygen concentration may be, e.g., 2%. The blades 428 shear the olive drupes as the olives pass through and the perforated screens mill and reduce the size of the ruptured particles further as they pass through the first apparatus from the inlet opening 422 to the outlet opening 424. Although a first apparatus to produce a homogenized paste having blades and perforated screens is described herein, any means which is capable of producing a homogenized paste from a commodity may be suitable for use in the first apparatus.

The first apparatus anaerobically compacts the paste which may then be extruded from the first apparatus as a solid mass body. The anaerobic compaction reduces the oxygen which is present in the commodity as it is moved through the system. The reduced oxygen levels reduce the potential for oxidation of desirable compounds during the shearing and milling stage.

In an optional embodiment, the production of the paste may take place under a controlled oxygen environment. In an embodiment where the first apparatus 420 has a means for flushing the first apparatus 420 with an inert gas, for example nitrogen, the introduction of inert gas into the first apparatus 420, the shearing process may take place in an inert environment. The inert environment reduces the potential for oxidation of desirable compounds during the production of the commodity paste, e.g., during a shearing and milling stage.

The process may include both shearing and milling the fruit. The shearing blades may optimize the initial lysis of the cell wall. The presence of ground stones (endocarp) may also act to lyse the cells, and well as ensuring that any oil contained within the stones can be extracted.

The paste, e.g., having ruptured olive particles, is propelled and extruded through the outlet of the first apparatus 420 to the inlet opening of the second apparatus 440, and into the concentric shaft of the second apparatus 440. The paste occupies the interior space of the second apparatus such that there is no head space between the paste and the interior walls of the second commodity and the movement of the paste through the second apparatus can be modelled as a solid plug flow. Once the interior of the second apparatus is filled, the means for moving the paste through the second apparatus causes the paste to move, as a solid plug flow, through the second apparatus, at the rate at which it is introduced in the second apparatus. In this way, the flow of paste from the first apparatus through the second apparatus is continuous.

The paste may be moved through the second apparatus under pressure. The solid mass characteristics of paste are maintained as the paste is moved from the first apparatus to the second apparatus.

The size distribution of ruptured olive particles may be proportional to the mass flow rate through the mill. Hence, reducing the size of the ruptured olive particles reduces the viscosity of the olive paste. Since the fruit has been both sheared and milled, the resultant pulp may not require the addition of liquid to assist its passage between the first apparatus 420 of the system 400 and the second apparatus 440.

In the second apparatus 440, the paste, modelled as a solid plug body, may be continually mechanically radially agitated by the spikes attached to the rotatable concentric shaft. The rotatable radial protrusions further homogenize the paste and promote any enzymatic reaction taking place during the passage of the paste through the reaction chamber.

In an alternative embodiment, where the second apparatus 440 includes a screw, the screw 446 rotates, thereby kneading and malaxing the paste supplied from the first apparatus 420, while propelling the paste from the first opening 442 to the second opening 444. The size of the olive particles produced by the first apparatus 420 results in a flow rate which enables the paste to be propelled from the inlet 442 to the outlet 444 of the second apparatus.

Moving the paste, or sheared commodity through the second apparatus 440 may take between 20 to 40 minutes. Moving the paste from the first opening 442 of the second apparatus 440 to the second opening 444 of the second apparatus 440 allows the process to be continuous as the paste is malaxed as it moves from the input 442 of the second apparatus 440 to the output 444 of the second apparatus 440 and towards the third apparatus 460.

Further lysis of the plant cells of the sheared commodity may occur in the second apparatus 440 due to the enzymes that have been released from the vacuole of the plant cells during the shearing process. The action of these enzymes may result in emulsion breaking and changes in the rheological properties of the paste, resulting in a higher oil yield and a better phase separation, which may in turn lead to a shorter cycle.

The interior of the second apparatus or malaxer may be pressurized such that the paste is subject to a pressure above atmospheric pressure, e.g., 3 to 4 bars (300 to 400 kPa), which may also improve lysis.

The malaxed olive paste is then propelled from the outlet 444 of the second apparatus 440 to the inlet 462 of the third apparatus, cylindrical screw press 460, where the separation of the liquids from the pomace/biomass takes place. The two phases of the thoroughly malaxed olive paste (liquids and solids) may be separated using a cylindrical screw press. As a result of the change in the rheological characteristics of the paste, the phases (liquids and solids) can be separated more thoroughly.

The liquids may then be pumped continuously into sedimentation tanks for the recovery of olive oil. The liquid phases of the olive juice (water and oil) extracted may be continuously separated by sedimentation.

The liquids may be continuously pumped to a separator fluidly connected to the third apparatus. The separator may comprise a series of gravimetrically decanting vessels for the continuous and final separation of water from oil. The continuous pumping of the liquid to a separator allows a wholly continuous process, from introducing the commodity to the first apparatus, preparing a paste from the commodity in the first apparatus, moving the paste through a second apparatus or reaction chamber, separating the paste into solids and liquids in a third apparatus and separating the liquid into its components (e.g. oil and water).

The above process uses an inert environment, by anaerobically compacting the commodity and/or the introduction of an inert gas in the first apparatus which may allow the extension of the malaxing time (which can lead to improved oil yields) and inhibit the damage caused by oxidoreductase enzymes present in olive fruit, such as PPO and POX. The endogenous enzymes are set free during the milling process, when the plant cells are mechanically ruptured during the milling operation of the olive drupe. Olive juices are liberated by plasmolysis of the olive cells.

Pectic substances cement the olive cells and affect the texture of the olive paste.

During malaxing these pectic substances are hydrolyzed by pectinolyc enzymes and the olive paste becomes softer. The change in rheological properties assist in allowing the paste to be moved through the second apparatus 440, i.e., from the inlet 442 of the second apparatus 440 to the outlet 444 of the second apparatus 440, without the addition of water, so that the process can be continuous. There is also no need for the introduction of additional water when the sheared commodity leaves the second end 444 of the second apparatus 440 and is passed to the separator 460, due to the lower viscosity of the sheared commodity. At no point of the entire process line is any additional water added. Thus, oxidation and significant losses of desirable compounds caused by the presence of water can be reduced.

Malaxing or kneading of the paste facilitates cohesion of smaller oil droplets into larger droplets that are easier to separate while also optimizing the tissue rupture by the action of olive enzymes and the action of the pit fragments. Complex bioprocess takes place during malaxing of the olive paste. The biochemical and rheological reactions will be closed loop controlled by instrumentation, for example control instruments connected to connection ports of the second apparatus in this described process.

The oxygen concentration may be regulated during milling and malaxation by injecting inert gases through the connection ports.

Olive paste exposed to pure oxygen exhibits higher activities of polyphenol Oxidase PPO and peroxidase POD. Polyphenol oxidase or PPO (EC 1.14.18.1) is considered the enzyme responsible for quality deterioration and browning in different fruits during postharvest period. Many of these biochemical and physical-chemical phenomena, including complex enzymatic activities, are mainly caused by endogenous hydrolases, oxidases, and lipoxygenase (LOX). Polyphenoloxidase (PPO) and peroxidase (POD) assist in the loss of these secoiridoids derivatives via oxidative enzymatic degradation. Complex enzymatic reactions trigger the formation of aromatic substances, the oxidation of phenolic compounds to lower the phenolic concentration of the oil, and the modification of the polarity of some of the compounds; in addition, the complex diffusion phenomena allow compounds critical for the taste, stability, and health value to be transferred from the aqueous phase into the oil. (Kalua et al., 2007). Oxygen contact between environmental air and olive oil during vertical centrifugal cleaning induces a greater formation of hydroperoxides from polyunsaturated fatty acids through a radical mechanism during long-term storage.

The concentration of phenolic compounds is strongly affected by several endogenous enzymes present in the olive drupes such as polyphenol oxidase (PPO), peroxidase (POX) and lipoxygenase (LPO) that are activated during processing. Inhibition of PPO and POX, which catalyze the oxidation of phenolic compounds during malaxation, increases the concentration of hydrophilic phenols in olive paste. Volatile compounds (VC) in VOO do not originate from the fruit, they are formed during processing. Most of these aromatic VC are formed through the action of enzymes that are released when the fruit is crushed/milled, and continue to form during malaxation. Indeed, increasing temperature levels to around 35'C during the olive paste malaxing process, favors the activity of oxidoreductase enzymes present in olive fruit, such as PPO and POX. PPO is the main enzyme involved in phenolic oxidation at the milling step whereas POX activity seems to be the main influence during the kneading step.

In the complete, continuous, process, including preparation of paste from a first commodity, malaxing the paste, and separation of solids from juices, the oxygen presence will be fully controlled in order to optimize the phenolic concentration in VOO. This is a fundamental aspect from a technological standpoint.

In fact, due to the strong variability in phenol concentrations in the olive fruits, related to agronomic factors such as cultivar, fruit ripening, and agronomic practices, the malaxing conditions will be modulated to obtain the optimal values of phenols in VOO without significant modifications to the aroma profile.

In the processing line of a system such as that of FIGS. 4 to 7, the malaxing parameters are regulated and the chemical/biochemical and rheological changes of olive paste are monitored and sustained, in real time, continuously and precisely.

In such a process, malaxing time may be increased to obtain an increase of the oil extraction yield without any loss of active components beneficial to health, such as hydroxytyrosol, tyrosol, caffeic acid, and oleocanthal.

The process described above provides improved lysis of the olive drupe cells under zero oxygen environment while simultaneously the biochemical and physiological reactions are taking place in a continuously monitored and controlled and sustained environment.

Since fruit is continuously moved through the second apparatus 440, or malaxer, the process is continuous. There is no need to complete processing of one batch of olives before the next batch of olives is introduced to the apparatus. Thus, more fruit can be processed in a shorter amount of time, resulting in an improved yield for the producer.

Oxidation of desirable compounds is reduced, owing to the reduction in oxygen, water content addition and heat generated during the process. Thus, olive oil produced during a process such as that described with respect to FIGS. 4 to 6 may have an increased concentration of desirable compounds in comparison with olive oil produced using known methods. In the continuous oil extraction line, the entire line can be fitted with a series of closed loop sensors able to monitor and take corrective action in real time to achieve the best quality and yield of VOO.

Therefore, with process automation, a high-quality product can be produced and sustained and optimal process yields at low costs without operator interference.

Although the above example has been described with respect to extracting juice from olives, other fruit may be suitable for processing using the apparatus of FIGS. 4 to 7. For example, the production of juice from an orange, grapes or similar fruit, may be optimized by shearing the fruit cells and malaxing the resultant paste before separating the juice from the solids.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

I claim:

1. A system for obtaining a substance from a commodity, the system comprising:
   a first apparatus having a first opening and a second opening, said first apparatus comprising means for continuously moving the commodity from the first opening to the second opening, and at least one blade for shearing the commodity to form a sheared commodity, the at least one blade positioned between the first opening of the first apparatus and the second opening of the first apparatus;
   a second apparatus having a first opening and a second opening, the first opening of the second apparatus fluidly connected to the second opening of the first apparatus, the second apparatus comprising a means for continuously moving the sheared commodity from the first opening of the second apparatus to the second opening of the second apparatus; and
   a third apparatus including a separator for obtaining the substance from the sheared commodity, the separator having a first opening fluidly connected to the second opening of the second apparatus for continuously receiving the sheared commodity from the second apparatus;
   wherein the first apparatus comprises a means for anaerobically compacting the sheared commodity and wherein the second apparatus operates as a plug flow reactor.

2. A system according to claim 1, wherein the first apparatus comprises a plurality of blades for shearing the commodity.

3. A system according to claim 1, wherein the first apparatus comprises at least one perforated plate for each blade.

4. A system according to claim 3, wherein perforations of the perforated plate have a diameter of between 0.5 to 20 mm.

5. A system according to claim 1, wherein the separator further comprises a second opening through which a liquid phase of the commodity can be collected and can be fluidly connected to a sedimentation tank, and a third opening from which a solid phase of the commodity can be collected.

6. A system according to claim 1, wherein the means for moving the commodity comprises a mechanical moving means.

7. A system according to claim 1, wherein the first apparatus comprises a means for continuously extruding the anaerobically compacted sheared commodity into the second apparatus at a first rate.

8. A system according to claim 7, wherein the means for moving the commodity from the first opening of the second apparatus to the second opening of the second apparatus comprises a means for moving the commodity at said first rate.

9. A system according to claim 1, wherein the second apparatus comprises a cylindrical body and a cylindrical shaft disposed concentrically within the cylindrical body.

10. A system according to claim 9, wherein the cylindrical shaft comprises at least one protrusion disposed radially inward.

11. A system according to claim 10, wherein the at least one protrusion comprises a spike.

12. A system according to claim 1, wherein the means for moving the sheared commodity from the first opening of the second apparatus to the second opening of the second apparatus comprises a means for kneading the sheared commodity.

13. A system according to claim 1, wherein the second apparatus comprises at least one connection port connectable to a pipe for supplying the second apparatus with a gas or to a control instrument.

14. A system according to claim 1, wherein the commodity comprises olives and the substance is olive juice.

15. A system according to claim 1, wherein the separator comprises a screw press having a first opening fluidly connected at a first rate with the second opening of the second apparatus, a second opening from which an extracted liquid phase of the commodity can be collected and can be fluidly connected to sedimentation tanks, and a third opening from which a solid phase of the commodity can be collected.

16. A system according to claim 1, wherein the separator comprises a first concentric cylinder and a second concentric cylinder disposed within the first concentric cylinder, and wherein at least one of the first and second concentric cylinders optionally is permeable.

17. A system according to claim 1, further comprising:
   a sedimentation tank or a series of gravimetrically decanting vessels for further processing of a liquid phase of the commodity so that the substance can be collected.

18. A system according to claim 17, further comprising:
   a pump for continuously moving the substance from the separator to the sedimentation tank or the series of gravimetrically decanting vessels.

19. A system according to claim 3, wherein perforations of the perforated plate have a diameter of between 2 to 10 mm.

* * * * *